May 9, 1967

R. L. FERM ETAL 3,318,529

APPARATUS FOR APPLYING MULCH HAVING AN INTERMITTENTLY
OPERATED SOLENOID VALVE

Original Filed July 15, 1963

INVENTORS
RICHARD L. FERM
SIDNEY V. SMITH
CHARLES E. MORAN

BY

ATTORNEYS

INVENTORS
RICHARD L. FERM
SIDNEY V. SMITH
CHARLES E. MORAN

BY
ATTORNEYS

United States Patent Office 3,318,529
Patented May 9, 1967

3,318,529
APPARATUS FOR APPLYING MULCH HAVING AN INTERMITTENTLY OPERATED SOLENOID VALVE
Richard L. Ferm, El Cerrito, Sidney V. Smith, Yuba City, and Charles E. Moran, Berkeley, Calif., assignors to Chevron Research Company, a corporation of Delaware
Original application July 15, 1963, Ser. No. 294,897. Divided and this application Dec. 29, 1965, Ser. No. 535,625
4 Claims. (Cl. 239—69)

This application is a division of Ser. No. 294,897 filed July 15, 1963, now abandoned.

This invention relates to improved agricultural methods and apparatus and, more particularly, this invention relates to methods and apparatus for selectively applying fluid substances, such as petroleum based mulches, to the soil to prevent crusting of the soil and to promote germination of seeds in agricultural practice.

Soil crusting is a widely occurring problem in agriculture and a serious obstacle to plant emergence and development. Formation of a crust after a field has been seeded interferes with and even precludes emergence and normal healthy growth of the seedlings. Germinated, sprouted seedlings are often unable to break through the crust and uneven and weak crop stands result. When uneven emergence of seedlings, and as a consequence nonuniform development and ripening, occurs, in the case of lettuce for instance, hand labor must be sent out to harvest the crop because a machine would be nonselective between the ripened and nonripened portion. Obviously, this increases operating costs of producing the crop.

The problem of soil crusting has been recognized and many solutions have been advanced to solve it. One solution has been the application of a mulching fluid to the soil after seeding. Heretofore, the mulch or anticrusting agent has been uniformly applied to the field, either entirely or in regularly spaced bands running the length of the seed bed. The application of a mulching material to the field often overcomes the soil crusting problem. However, the above methods of applying the mulching material, which methods were heretofore thought necessary to obtain good results, resulted in waste of a large portion of the mulching material. Further, in the case of certain agricultural products such as lettuce, etc., where the common practice is to plant a continuous row of seeds, allow them to germinate and emerge, and then to thin the seedlings out by hand so that plants remain only at selected intervals, the previously practical methods of applying a mulching material over the entire row of seeds did nothing to solve the problem of later thinning the crop. Further problems that are associated with applying the mulching agent in the above manner include the large quantity of mulch needed to cover the field and the resulting high weight of the equipment for applying it.

It is a particular object of this invention to provide methods and apparatus for applying mulch to the soil of a seed bed in spots having limited areal coverage and spaced apart at predeterminable selected intervals.

Briefly, the present invention comprises the steps of establishing a movable reservoir of fluid mulching material having a viscosity within a preselected range, moving the reservoir over a soil surface containing planted seeds, applying a predeterminable pressure on the mulching material in the reservoir, flowing at least a portion of the mulching agent to a position above the soil and then directing a limited amount of the mulching material at the soil to produce a spot or an impact area of the mulching material on the seeded soil having a generally circular pattern of relatively small diameter and moving said reservoir along the seed row while periodically directing limited quantities of mulch at the soil to provide mulched spots of limited areal coverage at intervals over the seed bed.

Apparatus for applying the mulch to the earth's surface comprise a movable frame, reservoir means on said frame for containing a quantity of the mulch, means for applying pressure on mulch in the reservoir, conduit means for flowing the mulch from the reservoir to a position above the soil surface, normally closed valve means on said conduit, nozzle means for directing mulch at the said surface on said conduit downstream of said valve means, and means for actuating said valve means to allow a predeterminable amount of mulch to periodically pass said valve means and to be expelled through said nozzle means so as to strike the soil to provide spots of limited coverage at selected intervals of the seed row.

Further objects and advantages of the invention will become apparent from the following detailed description read in light of the accompanying drawings which are a part of this specification and in which.

Figure 1:
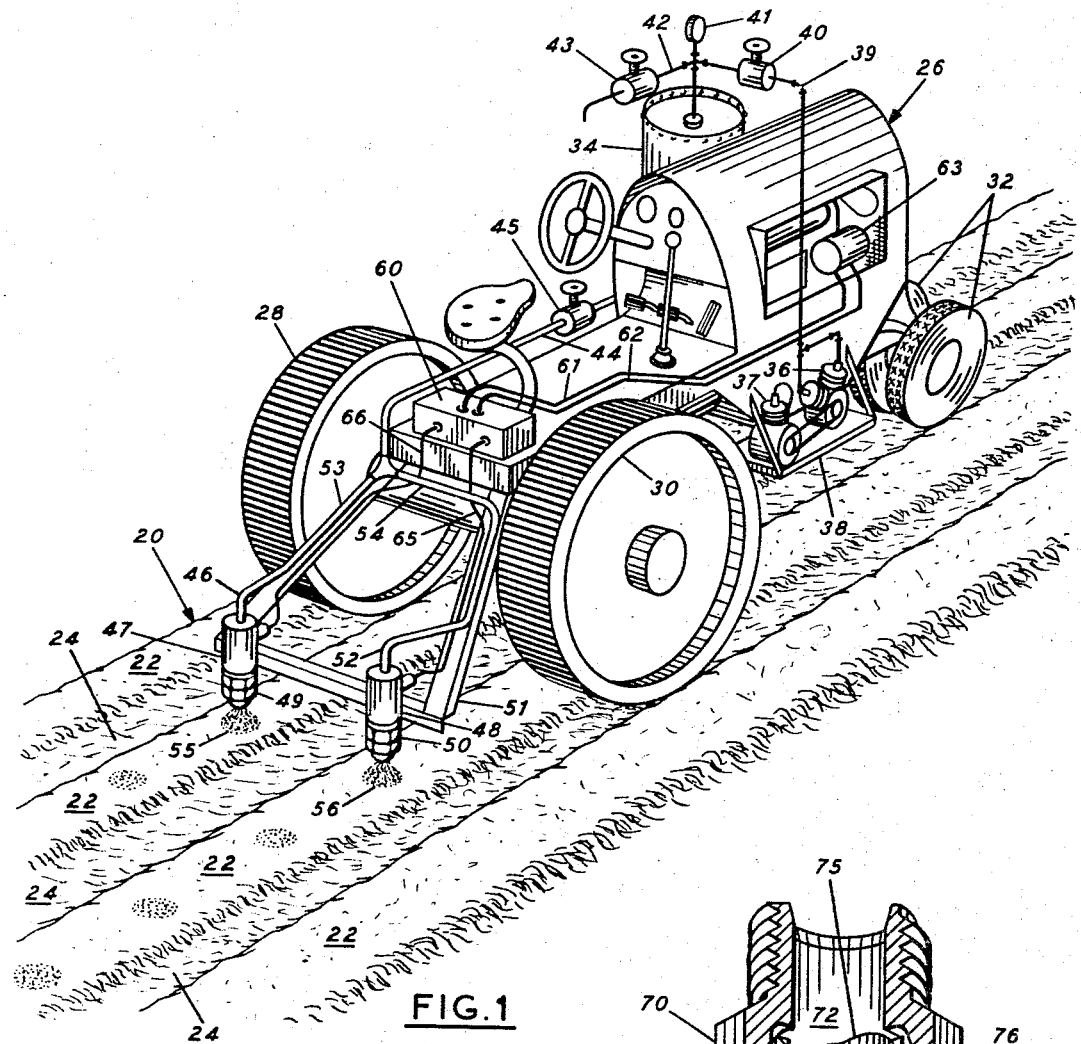
FIG. 1 is a view illustrating the preferred embodiment of apparatus assembled in accordance with the present invention.
Figure 2:
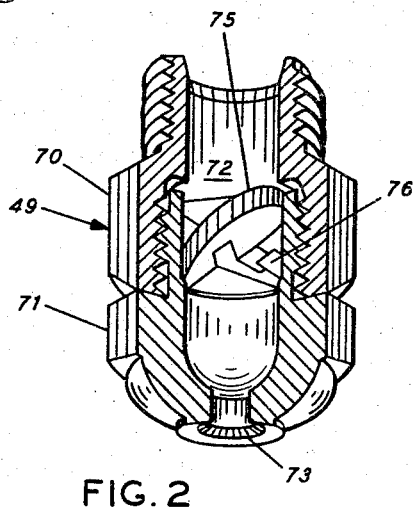
FIG. 2 is a sectional view of a form of nozzle useful in the present invention.
Figure 3:
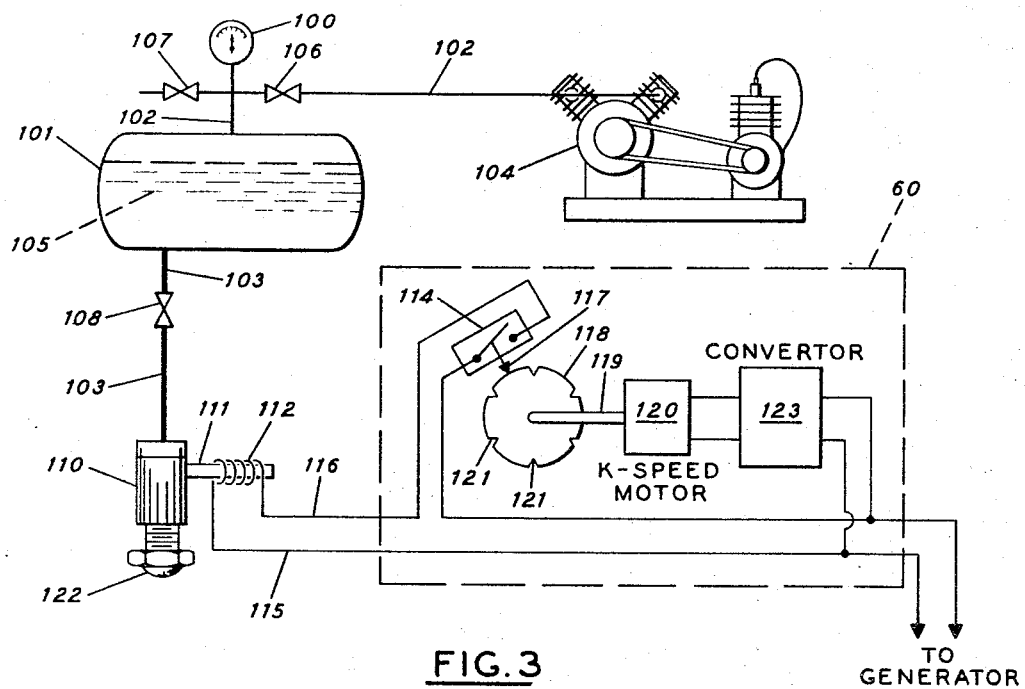
FIG. 3 is a diagrammatic view and illustrates apparatus assembled in accordance with the preferred embodiment of the invention.
Figure 4:
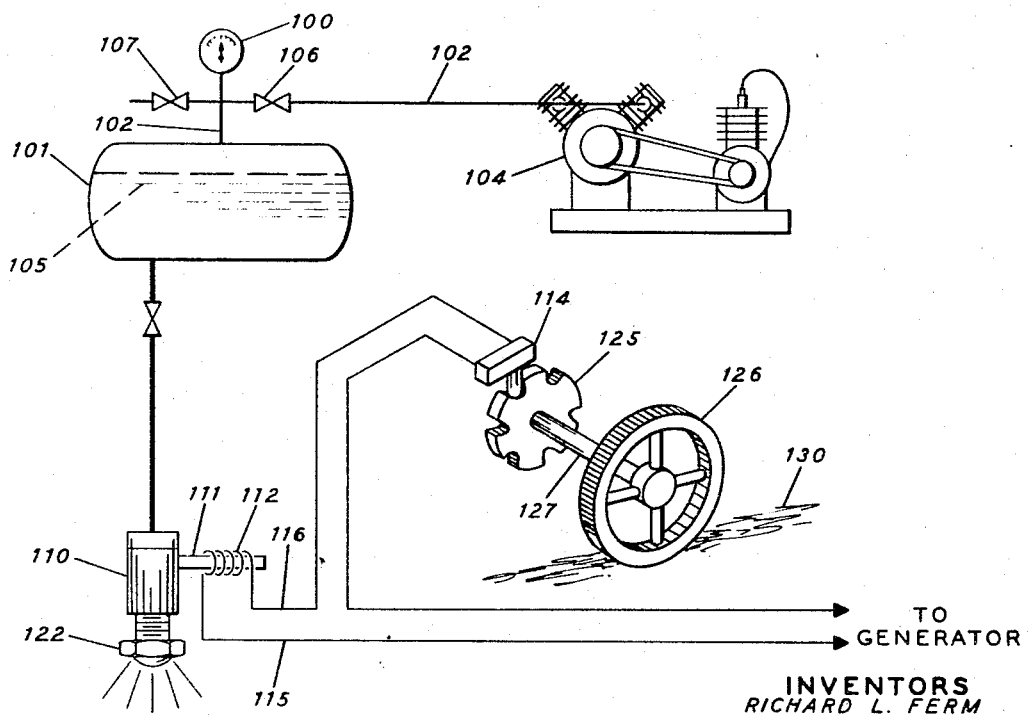
FIG. 4 is a diagrammatic view and illustrates apparatus assembled in accordance with an alternative embodiment of the present invention.

In FIG. 1 a planted field is generally represented by the numeral 20. Seeds have been sown or planted in rows 22. For example, lettuce seeds are commonly planted by a mechanical seeder which deposits a continuous stream of seeds in proper position along a row such as row 22. The planted rows 22 are spaced apart by furrows 24. The arrangement of the field in FIG. 1 is general and similar arrangements are used with many crops.

A tractor, represented generally by numeral 26, is shown. The rear wheels 28 and 30 of the tractor run in the furrows as do the front wheels 32. The tractor 26 is a suitable movable frame for moving the apparatus of the present invention over the field 20. Reservoir means, such as tank 34, are mounted on and carried by the tractor 26. The reservoir means 34 should provide for at least 20 gallons of liquid storage capacity and preferably 40 to 50 gallons of liquid storage capacity. The reservoir means is constructed in a manner to withstand at least 50 p.s.i. A means to increase the pressure on the contents of the reservoir means is also provided. For example, a compressor 36 and drive motor 37 are mounted on the tractor 26 on platform 38. An air supply line 39 carries compressed air from the compressor through valve 40 and pressure gauge 41 to the reservoir means 34. In this manner the pressure on the reservoir may be maintained at a desired level. A blowdown line 42 is provided with a manually operated valve 43 to release the pressure on fluid in the reservoir 34 when desirable.

A conduit 44 extends out of the reservoir 34 for flowing fluid therefrom. A valve 45 is provided on the conduit 44 within easy reach of the operator of the tractor. Conduit 44, which may be divided into two or more conduits such as 53 and 54 provides a path for flowing the mulching material, which is usually a liquid or an emulsion, from the reservoir 34 to a position as indicated by numerals 46 and 52 directly above the planted field 20.

A support member 51 extends downwardly from the tractor 26. The support member is rigidly connectable on the tractor. A pair of suitable valves 47 and 48, which may be solenoid valves for example, are affixed to the frame 51. The valves 47 and 48 are connected on conduits 53 and 54 to control flow therethrough. Nozzles 49 and 50 are connected to the valves 47 and 48, respectively, to receive any flow passing therethrough. The nozzles 49 and 50 are positioned to direct a spray, as indicated by 55 and 56, at the earth. The spray leaving the nozzle is radially expanding and forms on striking the earth a generally circular pattern having a substantially constant density.

Actuating means are provided to actuate the valves 47 and 48. Thus the valves 47 and 48 are opened for a short time interval to spray the mulching agent on the ground. A preferred arrangement includes the use of normally closed solenoid valves 47 and 48. An actuating means for opening and closing the valves 47 and 48 at selective periodic intervals includes a switch and timing wheel arrangement contained in box 60 and fully described below with reference to FIG. 3. The actuating means in box 60 is supplied with current by means of leads 61 and 62 extending from the generator 63 of the tractor. Suitable electric cables 65 and 66 carry the current from box 60 to the solenoid valves 47 and 48 to operate the valves. A manual switch (not shown) may be incorporated into the electrical system at a suitable location for manual cutoff of the system if desired.

A regular pattern of spot applications of the mulch is made. The actuating device periodically opens the valves for a short time period to cause the mulch to be sprayed on the ground in a pattern having substantially constant density of mulch particles. It has been found that the application of the mulch to the soil surface need not be continuous to be effective. In fact it has been found that spot application having a generally circular pattern with a diameter as small as 2" gives satisfactory results when spaced at the desired plant spacing along the row. According to the present invention then the tractor is moved across the field in a manner to align the nozzles with the seeded rows and the actuating means is set with a predeterminable program to cause a spray of uniform density to jet from the nozzles at periodic intervals along the seed rows to provide spots of mulch material at selected intervals along the seed row.

A sectional view of a preferred form of nozzle, such as for example nozzle 49, is shown in FIG. 2. As there shown, the nozzle comprises an upper body section 70 and a lower body section 71. A flow path 72 is provided through the interior of the body sections. The flow path has an orifice 73 which causes the fluids flowing through the nozzle to be jetted therefrom in an expanding stream. A pair of circular discs 75 and 76 are arranged in the flow path 72 to impart a swirling motion to the fluid passing through and to thus provide a stream having a substantially constant density of fluid particles. The nozzle has a delivery range from between 1.0 to 2.0 gallons per minute of a fluid having a viscosity of 20 to 200 S.S.F. at 40 p.s.i. pressure.

With reference to FIG. 3, the preferred embodiment of apparatus of the present invention is diagrammatically illustrated. The reservoir means 101 is supplied with a suitable inlet conduit 102 and an outlet conduit 103. A compressor 104 is provided to apply pressure to the mulching material 105 contained in reservoir 101. Suitable valves 106, 107 and 108 are connected, respectively, to the inlet conduit 102, the blowoff line, and the outlet conduit 103. A normally closed solenoid valve 110 is connected on conduit 103. The valve is opened when coil 112 is energized to cause core 111 to move out of and to thus open the valve. The coil is connected in series by leads 116 and 115 and is periodically electrically excited by suitable means such as the equipment shown inside of box 60. The electrical leads 115 and 116 are connected to a suitable source of current such as a generator. A normally open switch 114 is connected into lead 116. The switch is open so long as spring-loaded push rod 117 is depressed by a notched wheel 118. The notched wheel 118 is rotated by shaft 119 driven at a constant speed by motor 120. As the push rod of the normally open switch 114 extends into each notch 121 of wheel 118 the switch is closed energizing the coil 112 to open the solenoid valve 110. The valve remains opened while the rod is in the notch. As the wheel 118 turns, the rod 117 is depressed to cause the switch to open and thus close the valve. In this manner a spot of mulching fluid is sprayed at periodic intervals through nozzle 122. Thus the pulsating apparatus of the invention provides spot application of the mulching material at selected intervals along the seed row.

An alternative arrangement of apparatus for periodically applying a spot of mulch to the soil is diagrammatically shown in FIG. 4. A reservoir 101 of a mulching material 105 is maintained at a suitable pressure by compressor 104. A solenoid valve 110 and nozzle 122 are connected in an appropriate location and communicate with the outlet conduit from reservoir 101. The solenoid valve 110 is normally in a closed position to prevent flow through nozzle 122. The solenoid valve 110 is opened by excitation of coil 112. The coil is excited periodically by an actuating means which include ground wheel 126, drive shaft 127, notched wheel 125, and switch 114. The switch is in a closed position when the switch button is extended into a notch on wheel 125. When the button is depressed by the rim of the wheel 125 the switch opens to close the solenoid valve 110.

In this regard the size of and the spacing of the notches on the notched or timing wheel control the size of the spot and the location of the spots. It will be apparent that since different crops require spot applications on different centers, it is within the skill of the art to prepare a timing wheel of the proper diameter and notches of proper size.

In order to effectively prevent crusting of the soil and to promote seed germination and seedling emergence, the mulching fluid is applied to the soil in a particular manner. Thus it has been found that the mulch to be sprayed on the soil in accordance with the present invention should have a viscosity of between about 20 and 200 S.S.F. at 77° F. A particular mulching composition that is useful in accordance with this invention is fully described in copending application Ser. No. 295,230, filed on July 15, 1963, now Patent No. 3,261,127, by Richard L. Ferm and Charles E. Moran, and owned by a common assignee. The mulch composition as there described is mixed with water in an appropriate manner to provide a mulching fluid having a viscosity within a range of 20 to 200 S.S.F. at 77° F.

The nozzle used to jet the mulching fluid at the soil emits the mulch in a fine spray. The density of the particles in the expanding spray is substantially constant to provide uniform mulch application in the impact area. In this regard it has been discovered that beneficial results are obtained with relatively small areas of mulch application. Areas or spots of mulch application about 2" in diameter have given excellent results. It has been found that the density of the mulch having a viscosity of 20 to 200 S.S.F. at 77° F. when applied in this manner should be in the range of .05 gallon per square yard to .2 gallon per square yard of application. The best results are obtained in this invention by using a mulch material for spraying, which material has a viscosity of between 30 and 40 S.S.F. at 77° F.

The manner in which the spray is directed at the earth's surface is important to the successful application of the mulch in accordance with this invention. The spray must not only be of a critical density as indicated above it must also be directed at the ground in a particular manner. The nozzle through which the mulch is jetted must provide a radially expanding stream. The nozzle is positioned within a limited height range above the ground. It has been found that the nozzle should be between about 4″ and 8″ and preferably about 6″ above the soil surface on which the mulch is applied. The mulch is sprayed through a nozzle having a delivery rate of between 1 to 2 gallons per minute of a fluid having a viscosity of 20 to 200 S.S.F. at 40 p.s.i. The pressure on the mulch when it is delivered is adjusted to a value between about 30 and 60 p.s.i. Pressures greater than 60 p.s.i. cause the sprayed mulch to erode the soil when striking. On the other hand the spray of mulch is not satisfactorily atomized when the pressure on the reservoir is substantially less than 30 p.s.i. Thus the proper application of the mulch in spots in accordance with the invention is dependent in these respects on the pressure on the reservoir.

The method of spot applying mulch in accordance with the present invention is useful with a variety of plants. Suitable plants include lettuce, sugar beets, cotton, melons, and other plants which are planted as seeds in a row. Application of the mulch in spots has been found to result in excellent plant emergence in the spotted portions of the seed bed. Thus waste of mulch is prevented. Further, applying the mulch in periodic spots helps to aid in thinning the crop. Thus the spots are applied at various intervals over the seed row. For example, a desirable interval (center to center) of spots applied to lettuce is about 12 to 14 inches. Following are typical examples which illustrate the improvement in crop production in accordance with the present method:

Example I

In this case, the anticrusting or mulching treatment was applied on a lettuce field of approximately 20 acres. The treated portion consisted of two rows, approximately 1200 feet in length. These rows were on raised beds, 40 inches on centers. This treatment used the following mulching material:

| | Percent by weight |
|---|---|
| Oronite Polybutene No. 32 | 59.6 |
| Oronite NI-W | 5.4 |
| Fresh water | 35.0 |
| | 100.0 |

This concentrated emulsion was subsequently diluted in a ratio of 1:1 with water to provide a suitable mulch material for application in accordance with the invention. This mulch material had a viscosity of approximately 30 to 40 S.S.F. at 77° F. The Oronite Polybutene No. 32 is a liquid polymeric material produced in the plants of California Chemical Company, Oronite Division. Various types of this material are sold under registered trademark designations of "Oronite Polybutenes" Nos. 24, 32, 64, 122 and 128. These materials are suitable for the preparation of mulching compositions for use in this invention. The Oronite NI-W is an ether of alkyl phenol useful as a liquid dispersant. It is sold under the trademark "Dispersant NI-W" by California Chemical Company, Oronite Division, of San Francisco, California. In this material the alkyl chain contains an average of 12 to 14 carbon atoms, the number of ethylene oxide units to impart water solubility being in the range from 8 to 12. The formulation and composition of the mulching agent is fully described in copending application Ser. No. 295,230 cited above, now Patent No. 3,261,127. Application was made in spots approximately 2 inches in diameter at 12 inch centers over the seed rows.

The location of this trial was in the vicinity of Soledad, California. The field consisted of the soil type designated as Salinas clay. Irrigation was accomplished by sprinkling approximately 2 to 3 inches of water to the soil.

Approximately 21 days elapsed from the time of application of the mulching agent until the observation of the test results. At the time of observation, it was noted that the untreated portion of the field had crusted badly, requiring the grower to "roll" the beds in order to break the crust. The spots which were treated with the polybutene did not crust. A healthy seedling emerged in every spot thus demonstrating the effectiveness of the mulch when applied in this manner. The breakthrough of seedlings in the untreated portion was spotty and erratic. Further, greater maturity was clearly apparent in the plants in the treated spots.

Example II

The treatment in this case was on melons and utilized the same material as in Example I, similarly diluted with water in a 1:1 ratio to give a material having a viscosity of between 30 and 40 S.S.F. at 77° F. The field size was somewhat greater than 30 acres. The treated rows were approximately 500 feet long with 72 inches between rows. Two inch spot applications of the mulching agent were applied on approximately 72 inch centers. The trial was located near Mendota, California, and was on a silty, clay loam.

Approximately 20 days after treatment, during which time the field had received intermittent rains, it was noted that emergence of seedlings had occurred through each spot in the spot-treated rows. On the othtr hand emergence was very erratic in the untreated areas. Thus the emergence of plants in the treated spots indicates that the mulch applied in small diameter spots in accordance with this invention is effective in preventing crusting and providing for seedling emergence with a minimum of wasting of mulch.

Example III

In this case, a 15-acre field of broccoli was treated with the same polybutene emulsion diluted as in the previous examples. The untreated rows were about 600 feet long on raised beds, 40 inches on centers. The mulching material was applied in 2 inch spots on about 12 inch centers in accordance with the method of this invention. The trial was located near Salinas, California, on silty, clay loam. Irrigation was by sprinkling with about 2 to 3 inches of water which resulted in the usual crusting problems. About 20 days after the treatment it was observed that excellent emergence and maturity had been obtained in the treated area, but that the rest of the field had to be "rolled" in order to allow adequate emergence of the crop.

Example IV

The emulsified polybutene applied in this treatment was the same as in the foregoing examples. The treatment was the spot method on a 15-acre field of cauliflower, near Salinas, California. Spots of mulching material of approximately 2 inches in diameter were applied on 12 inch centers. The treated rows were about 200 feet long on raised beds, 40 inches on centers. The field was one of silty, clay loam. Again irrigation was by sprinkling with from 2 to 3 inches of water.

About 20 days after the treatment, it was observed, as in the other examples, that the treatment had allowed emergence of the crop without resort to rolling and had resulted in a greater number of plants emerging and in greater maturity.

In accordance with the method of the invention there is also an application wherein the spot application of the mulching material is used with a second treatment to assist in promoting growth of crops at selected intervals and to thus at least partially, if not completely, eliminate the need for manual thinning of the crops. For example, it has been found that if a seeded field of a crop such as lettuce is treated with the mulching agent by spot application as described herein and then the entire field is watered, a crust will form on the untreated, watered portion of the field. However, no crust will form on the portions of the field which were spotted with mulch prior to the watering. The crust hinders or partially impedes emergence and growth of the crusted portion. In the mulched spots however, which have no crust, seedlings emerge and grow. Thus the need for hand thinning is at least partially eliminated.

In a further embodiment of the invention the mulch material is applied by the spotting technique to a row of plants which have already emerged and are growing. Thus in the case of lettuce for example where a crowded row of seedlings emerge and it is desired to thin out the row and have plants mature at selected intervals, the mulch material would be spotted on the lettuce at the desired intervals. A substance which normally kills the lettuce but which does not affect the mulched portion of the lettuce is then applied to the whole field. The unmulched lettuce will be killed while the mulched portion will survive and grow. If for example it is desired to automatically thin the lettuce field of Example I above, the mulching treatment using the polybutene mulch is first done after the seedlings emerge. Then the entire field is sprayed with a material such as oil which will kill the seedlings in the untreated areas. Materials other than oil which will serve the same or similar purpose include various herbicides.

It is apparent that modifications other than those described herein may be made to the embodiments of this invention without departing from the inventive concept. It is intended that the invention embrace all equivalents within the scope of the appended claims.

We claim:
1. Apparatus comprising a movable member, reservoir means on said movable member containing a fluid mulch material having a viscosity of between 20 and 200 S.S.F. at 77° F., pressure means for applying pressure on the said mulch material, an outlet from said reservoir means having a conduit extending therefrom, normally closed valve means on said conduit to prevent flow through said conduit, nozzle means on the downstream side of said valve means, said nozzle means having a delivery range of from 1.0 to 2.0 gallons per minute of said mulch and adapted to produce a radially expanded spray of relatively constant density of from .05 gallon per square yard to .2 gallon per square yard with mulch material having a viscosity of between 20 and 200 S.S.F. at 77° F., said nozzle means positioned to direct a circular spray of said mulch material at the surface of the soil from a position above the soil when said valve means are opened to produce a spot of mulch on the soil having a density of from .05 to .2 gallon per square yard and actuating means for periodically opening said normally closed valve means for a predeterminable time and predeterminable intervals.

2. The apparatus of claim 1 further characterized in that the pressure means applied from 30 to 60 p.s.i. pressure on the mulch.

3. The apparatus of claim 2 further characterized in that the nozzle means is positioned between 4 and 8 inches above the soil.

4. The apparatus of claim 1 further characterized in that the mulch material has a viscosity of between 30 to 40 S.S.F. at 77° F.

References Cited by the Examiner

UNITED STATES PATENTS

| | | | |
|---|---|---|---|
| 2,357,141 | 8/1944 | Singleton | 239—158 X |
| 2,616,760 | 11/1952 | Wallace | 239—100 |
| 2,788,240 | 4/1957 | Wilson et al. | 239—100 |
| 2,969,921 | 1/1961 | Tygart | 239—99 |
| 2,988,285 | 6/1961 | Shaffer | 239—100 |

M. HENSON WOOD, Jr., *Primary Examiner.*

VAN C. WILKS, *Assistant Examiner.*